(12) United States Patent
Becker

(10) Patent No.: US 8,939,258 B2
(45) Date of Patent: Jan. 27, 2015

(54) WIND TURBINE FOR GENERATING ELECTRIC POWER

(75) Inventor: Markus Becker, Münster (DE)

(73) Assignee: Kenersys GmbH, Münster (DE)

( * ) Notice: Subject to any disclaimer, the term of this patent is extended or adjusted under 35 U.S.C. 154(b) by 974 days.

(21) Appl. No.: 12/922,148

(22) PCT Filed: Nov. 6, 2008

(86) PCT No.: PCT/EP2008/065056
§ 371 (c)(1),
(2), (4) Date: Sep. 10, 2010

(87) PCT Pub. No.: WO2009/112093
PCT Pub. Date: Sep. 17, 2009

(65) Prior Publication Data
US 2011/0012365 A1 Jan. 20, 2011

(30) Foreign Application Priority Data
Mar. 11, 2008 (DE) .......................... 10 2008 013 728

(51) Int. Cl.
*F03D 9/00* (2006.01)
*F03D 11/02* (2006.01)

(52) U.S. Cl.
USPC ........................................................ 184/6.12

(58) Field of Classification Search
USPC .......... 184/4, 6.11, 6.12, 27.1, 27.2; 475/159; 290/55
See application file for complete search history.

(56) References Cited

U.S. PATENT DOCUMENTS

| | | | | |
|---|---|---|---|---|
| 4,431,372 A | * | 2/1984 | Dadhich | 415/175 |
| 4,629,033 A | * | 12/1986 | Moore et al. | 184/6.3 |
| 4,695,736 A | * | 9/1987 | Doman et al. | 290/44 |
| 4,709,785 A | * | 12/1987 | Csanady, Jr. | 184/6.4 |
| 6,877,360 B1 | | 4/2005 | Discenzo | |

FOREIGN PATENT DOCUMENTS

| | | |
|---|---|---|
| DE | 3231016 A1 | 2/1984 |
| DE | 202005014797 U1 | 12/2005 |

OTHER PUBLICATIONS

International Search Report and Written Opinion mailed Nov. 20, 2009.

* cited by examiner

*Primary Examiner* — William E Dondero
*Assistant Examiner* — Mark K Buse
(74) *Attorney, Agent, or Firm* — Chadbourne and Parke LLP

(57) ABSTRACT

The invention relates to a wind turbine for generating electric power by an air stream (1) onto a rotor (48) rotatable about a rotor axis (2), said rotor comprising a plurality of rotor blades (3, 4) and being coupled via a rotor shaft (5) to a generator (6), wherein a primary transmission (8) is present between the rotor shaft (5) and generator input shaft (7) for multiplication of the rotational speed, wherein the pressure-feed or force-feed lubricating system of said main transmission comprising a lubricating pump (9) enables the supply to components (46, 47) subject to wear, wherein the wind turbine (10) has an emergency pump (11) for lubricant supply, which during normal operation of the wind turbine is not operational and during spinning operation and/or a power failure can be connected and which is operated by the rotating rotor (48).

16 Claims, 5 Drawing Sheets

WIND TURBINE FOR GENERATING ELECTRIC POWER

CLAIM FOR PRIORITY

This application is a national stage entry entitled to and hereby claims priority under 35 U.S.C. §§365 and 371 corresponding to PCT application no. PCT/EP2008/065056, filed Nov. 6, 2008, which in turn claims priority to German application no. DE 10 2008 013 728.6, filed Mar. 11, 2008, all of which are hereby incorporated by reference.

The invention relates to a wind turbine generator for the generation of electrical power through incident air flow on a rotor rotating around a rotor axis with multiple rotor blades, being coupled via rotor shaft to a generator, wherein a main gear box is used to transmit the rotation speed from the rotor shaft to the generator input shaft, whose force and pressure feed lubrication through a lubrication pump enables the lubrication of components that are subject to wear and tear Wind turbine generators which generate electrical energy by air flow on a rotor rotating around a rotor axis are known in diverse variants the prior art. There is a rotating rotor shaft coupled to a generator around the rotor axis. A main gearbox couples the rotor shaft and generator input shaft to translate/multiply the speed. The components are subject to wear, so a pressure or forced lubrication system may supply lubricant of suitable viscosity using lubricant pumps.

The main gearbox in such a wind turbine generator translates a high torque and low speed of the rotor shaft to the high speed with lower torque on the faster side of the main gearbox i.e. on the side of the generator. In this way, consequently, the kinetic energy of the rotor shaft can be converted into electrical energy. It is known to use an inverter or other power electronics.

The main gearbox is subject to a high number of load changes and its continuous operation causes fatigue loads, so components such as gears and bearings require effective lubrication to prevent wear or damage and to ensure a sufficient life span of the wind turbine. In wind turbines, in addition to immersion lubrication systems, mainly, pressure or forced lubrication is used. The pressure or forced lubrication requires a lubricant pump, which can be operated both mechanically and electrically.

Such lubricant pumps are often associated with a filter and/or heat exchanger to regulate the purity and/or temperature of the lubricating oil. The task of the lubricant pump is to suck the heated lubricating oil from the sump and pump it through one or more filters, or, based on the oil temperature, through a heat exchanger, so that it can supply cleaned lubricating oil at predefined temperature to the main gearbox.

Mechanical lubricant pumps are partially integrated trough a countershaft in the main gearbox and are designed with regard to their translation or speed for the wind turbine operating speed range.

A disadvantage of mechanically driven lubricant pumps is that they are normally designed in such a way that only from a minimum speed of the rotor can a substantial amount of lubricating oil be pumped. This limit is well above the rotational speed of a wind turbine generator. This rotational speed is approximately in the range between one to five or even up to eight revolutions per minute. But if these lubricant pumps are designed to function at low speeds, the lubricant pump would be at high speeds during operation of the wind energy turbine rated in the field, resulting in extremely high lubricant pressure. Also, they were too large in the lower speed range.

Alternatively, electric lubricant pumps for pressure or forced lubrication are used, operating on a conventional power supply of grid/distribution grid. One particular issue that arises in wind turbine generators is that during power failures or initial installation or any necessary repair of wind turbine generator, no electrical voltage is available to operate electric lubricant pump. Failure of electrically operated lubricant pumps is also a problem for wind turbine generators because operation without the necessary lubrication risks premature wear and tear.

On the basis of this, the objective of the invention is to provide a wind turbine generator to create electrical energy, which is simpler and thus more cost-effective way to ensure an adequate supply of lubricant to the components subjected to wear during rotational operation and/or a power failure.

According to the present invention, the objective is achieved with a wind turbine generator according to claim 1. A preferred embodiment of the invention is set out in the claims. The invention relates to a wind turbine generator for the generation of electrical power through incident air flow on a rotor rotating around a rotor axis with multiple rotor blades, being coupled via rotor shaft to a generator, wherein a main gear box is used to transmit the rotation speed from the rotor shaft to the generator input shaft, whose force and pressure feed lubrication through a lubrication pump enables the lubrication of components that are subject to wear and tear. The invention is characterized further in that the wind turbine generator is equipped with an emergency lubrication pump for lubricant supply, run by the rotating rotor, that is deactivated under normal operation of the wind turbine generator and can be activated during idling mode and/or grid failure.

With the invention, an emergency lubrication pump is provided in addition to the lubricant pump to a reliable lubricant supply to components subject to wear, even in critical situations, such as power failure and/or during the rotational operation of a wind turbine generator. To improve the efficiency of wind turbine generator, an emergency lubrication pump is activated preferentially only in the aforementioned critical operating conditions. An emergency pump is deactivated in the normal operation of the wind turbine generator. Thus losses of energy can be avoided. The solution according to invention leaves itself very simple and without substantial constructional additional expenditure and ensures an increase of the life span of the entire wind energy plant, and/or a reduction of the maintenance intervals.

For an electrically operated lubrication pump, the required supply of electric energy is preferably made by a conventional power supply of the electrical grid. In addition or as an alternative, the lubrication pump can be operated mechanically. In this case, the lubrication pump is preferably integrated on a countershaft of the main gearbox and designed according to the main gear box's translation speed and/or operating speed range for the wind turbine generator. In particular, the mechanical lubricant pump is at least driven indirectly by the rotor.

In accordance with a first embodiment of the invention, the wind turbine generator exhibits a coupling unit for connection or disconnection of the emergency lubrication pump. The coupling unit serves to connect and/or disconnect the emergency lubrication pump, which can mean, for example, the coupling of the emergency lubrication pump with a shaft of the main gearbox.

According to a preferred embodiment of the invention, the coupling unit can include a switchable coupling. By the switchable coupling, each kind of switchable coupling is to be understood in the sense of invention. It is only important that the emergency lubrication pump is activated automatically in case of emergency, for example, during a power failure. Preferably, the emergency lubrication pump by interconnection with the switchable coupling is coupled with one of the shafts of the main gearbox. In particular the switchable coupling enables separation of the emergency lubrication pump from the rotor or the mechanical drive train of the wind turbine generator, preferably as a function of the rotor speed and/or availability of the electricity system in the normal operation of the wind turbine generator.

There is the possibility of providing as a switchable coupling a "Fail Safe coupling". Particularly, the switchable coupling may be designed with an electrical, magnetic or hydraulic decoupling option. Also, the switchable coupling with rotational operation and/or the power failure can be closed by a spring mechanism. Preferably, the switchable coupling in the normal operation of the wind turbine generator is open in particular against the spring force of spring mechanism. As long as the wind turbine generator is operated normally, such coupling using an electromagnetic mechanism is open. In case of grid failure, the coupling closes with the support of the spring, so for example force or frictionally engaged connection with a rotating shaft can be achieved.

In accordance with the present invention, the emergency lubrication pump is coupled or can be coupled with an emergency gearbox, whose output shaft speed is sufficient to drive the emergency lubrication pump and thus the lubricant may also be supplied with small rotor speeds. In particular, the emergency gearbox between the emergency lubrication pump and main gearbox system is switched. The emergency gearbox is upstream as a switchable coupling that connects the emergency lubrication pump. Alternatively, the emergency gearbox is connected between the switchable coupling and the emergency lubrication pump.

In order to increase the range of variation of the wind turbine generator according to invention and the applied emergency lubrication pump, a further development of the invention is that the wind turbine generator may include multiple rotating shafts of various rotating speeds and the emergency lubrication pump is coupled or can be coupled with at least one of these shafts, particularly through the intermediary of the switchable coupling. Thus, the emergency lubrication pump can act at different positions in the drive train of the wind turbine generator, which covers the rotating shaft preferably and is used for the tapping of the kinetic energy and for the drive of the emergency lubrication pump.

Preferably, a drive for the emergency lubrication pump in the field of high-speed or medium speed shafts should be provided, e.g. on the output side of the main gearbox system. For example, it is possible that the emergency lubrication pump is coupled with a drive shaft of the main gearbox, with an output shaft of main gearbox, or with an intermediate shaft of the main gearbox. The drive shaft of the main gearbox is rotation coupled or linked with the rotor shaft. Furthermore, the output shaft of the main gearbox is rotationally coupled or linked with the generator input shaft. The drive shaft of the main gearbox is relatively slow and rotates at a ratio of 1:1 (rotor speed:speed of the shaft) with rotor speed. The output shaft of the main gearbox runs in comparison to the driveshaft relatively fast, whereby the translation amounts to 1:70 to 1:120 (rotor speed:speed of the output shaft). The intermediate shaft of the main gearbox runs in comparison to the driveshaft intermediately, whereby the translation amounts to 1:10 to 1:20 (rotor speed:number of revolutions of the intermediate shaft). Preferably, the emergency lubrication pump interconnected with the switchable coupling is coupled with one of these shafts of the main gearbox, especially with the intermediate shaft of the main gearbox.

Apart from the possibility of driving the emergency lubrication pump with a conventional gearbox, the emergency lubrication pump can also be driven via mechanical coupling by means of torque transmission devices, like belts or chains. For example, belts in the sense according to the invention may be toothed belts or v-belts. Likewise, crankshafts and/or disk mechanisms for transmitting torque can be used. In addition, the mechanical coupling can cover different mechanical or hydraulic transmission systems. In particular, the mechanical coupling forms the emergency gearbox or a part of it.

The main gearbox preferably includes one or more planetary stages and/or two spur gear stages. In particular, the translation of the main transmission and/or transmission to operate the emergency pump, as well as the characteristics of emergency pump or fail safe pump is always designed so that a lubricant supply pressure is still reliably given at low spin speeds.

In addition to the equipment to create wind turbine generators with an intended solution, it is also possible run the switchable emergency lubrication pump as a retrofit kit for structural simplicity as per the invention.

The invention will be described with reference to a preferred embodiment, referring to the drawings, wherein.

Figure 1:
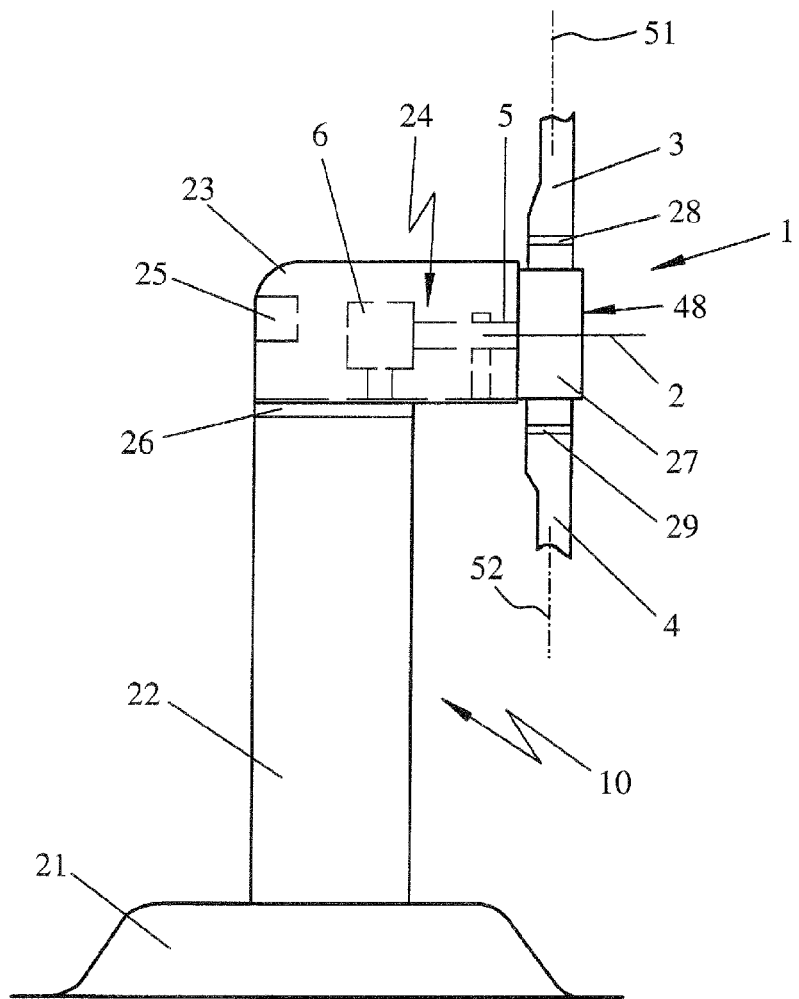
FIG. 1 is a schematic simplified representation of a wind turbine generator.

Wind turbine generator 10, according to the embodiment of the invention, is shown in FIG. 1. A tower 22 designed in accordance with the structural requirements for wind turbine generator 10 is used in a foundation 21. The upper part of the tower 22 constitutes a nacelle 23 that protrudes at least about vertical to the orientation of the tower 22. Within the nacelle 23 a gearbox—generator unit 24 is located which holds with several rotor blades 3 and 4 and is coupled through wind powered rotor 48. In FIG. 1 only two rotor blades are apparent, however the rotor 48 can also hold three or more rotor blades.

The rotor 48 is rotated around the rotor axis 2 and mounted on a rotor shaft 5 which is connected to gearbox-generator unit 24. The generator 6 of the gearbox-generator unit 24 is located at the back so the rotor 48 faces away from the area of the nacelle 23. In addition, the wind turbine generator holds the wind turbine controller 25. The nacelle 23 is mounted to the tower 22 such that nacelle 23 can be rotated by means of yaw drive 26. Each of the rotor blades 3, 4 mounted on a rotor hub 27 of the rotor 48 on the rotor shaft 5 can be operated independently by means of pitch drives 28, 29 about rotor blade axes 51, 52 so that the rotor blades 3, 4 can be made adjustable. Alternatively, the wind turbine generator can be stable without a pitch system.

Figure 2:
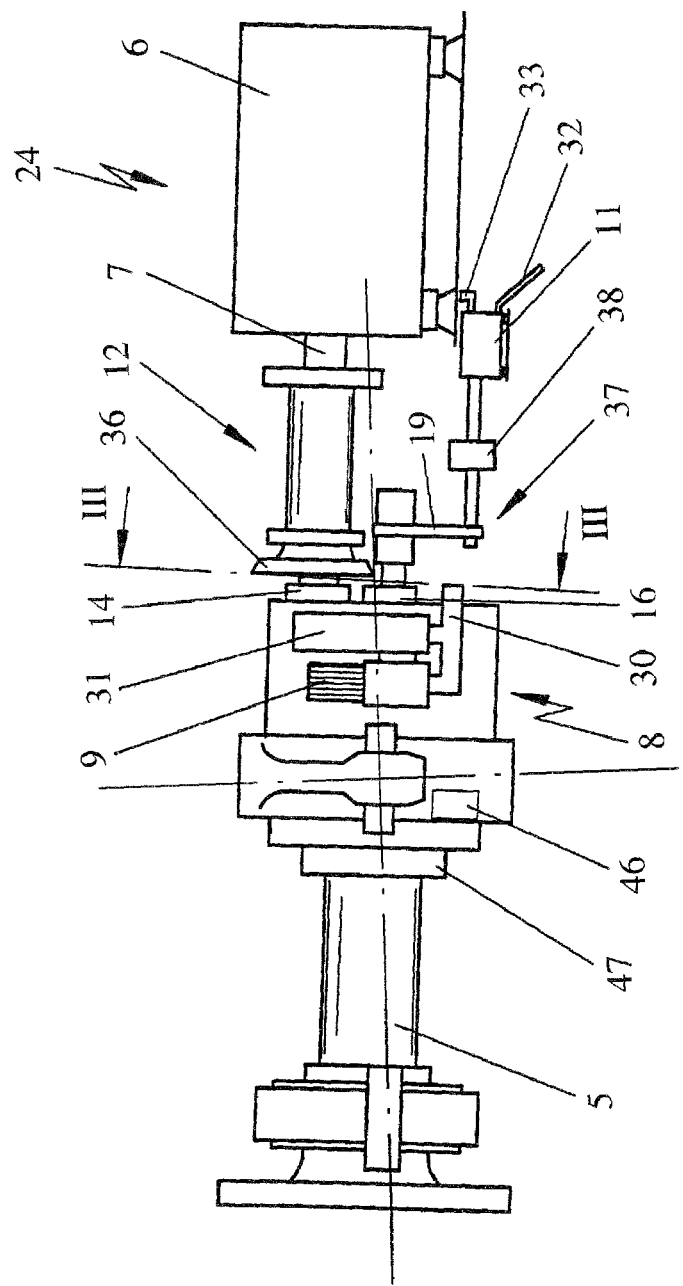
FIG. 2 is a view of a wind turbine generator gearbox generator unit.

FIG. 2 shows the gearbox-generator unit 24. In the left of the figure, a part of the rotor shaft 5 is represented. On the right side of gearbox 8, there is generator 6 which is used for the conversion of the kinetic energy in to electric energy, which arises from the rotor blades 3, 4 of wind turbine generators 10. Generator 6 includes a small input shaft 7 that connects the generator 6 to the drive train. This establishes the connection between generator 6 and 8 main gearbox using a coupling 12. The lubrication pump 9 of the generator 6 of the main gearbox 8 is responsible for the maintenance of the wear and tear of the underlying components of the wind turbine generator 10 with required lubricant for the lubrication. As lubricant suitable lubricating oil is used. The lubricant is sucked through the electrically operated lubrication pump 9 via gearbox sump 20 which opens suction pipe 30. A filter unit 31 is used to filter the lubricant. The components subject to wear are schematically indicated with the reference numeral 46. In one of these components is a shaft bearing 47. Particularly it deals with the components 46, 47 and the moving parts of the main gearbox 8.

The main gearbox 8 includes several rotating shafts 14, 15 and 16 which partly extend out from the gearbox, where in the extending out shaft extension usually covered with a cap which is not shown here. Thus main gearbox 8 particularly on generator side has several output shafts 14, 15 and 16 with different speeds. The shafts are better represented in the FIG. 3 which deals with the details below. The shaft 16 is the one which is coupled with the rotor shaft 5 of the main gearbox 8, the shaft 15 is the intermediate shaft of the main gearbox 8 and the transmission shaft 14 is the one coupled with generator output shaft 7 of the main gearbox 8. According to the invention at least one of these shafts 14, 15 or 16 are coupled with switchable coupling 38, which is connected to the emergency lubrication pump ii and used in the normal operation of the wind turbine generator. Operation of the emergency lubrication pump 11 is switchable the help of switchable coupling 38 in rotating operation and/or during the power failure. A suitable gearbox 37 between output shaft of gearbox 14, 15 or 16 and switchable coupling 38 ensures sufficient speed for emergency lubrication pump 11, for instance in the rotational operation, even at very slow and low speed of the wind turbine generator.

For coupling of the shaft 16 with one of the emergency lubrication pump 11, a belt 19 as shown in FIG. 2 is provided, which is arranged between the shaft 16 of main gearbox 8 and input shaft 34c of the emergency lubrication pump 11 and/or coupling 38, thus enabling transfer of the rotary movement of the shaft 16 to input shaft 34c of emergency lubrication pump 11 and/or switchable coupling 38. The belt transmission with the belt 19 makes this gearbox 37 an emergency operation gearbox. Alternatively instead of the belt 19 also a chain and/or toothed gear system is possible. The emergency lubrication pump 11 regulates through the suction pipe 32, which sucks the lubricant from the gearbox sump. In addition the emergency lubrication pump 11 holds a lubricating pipe which takes care of the component 46, 47 with the required lubricant. The procedure described in the FIG. 2 of the connection of shafts 14, 15 or 16 of the main gearbox 8 to the emergency lubrication pump is understood only as an example of variation. Another possibility of the combination of the emergency lubrication pump 11 with one of the shafts 14, 15 or 16 is shown in FIG. 3.

Figure 3:
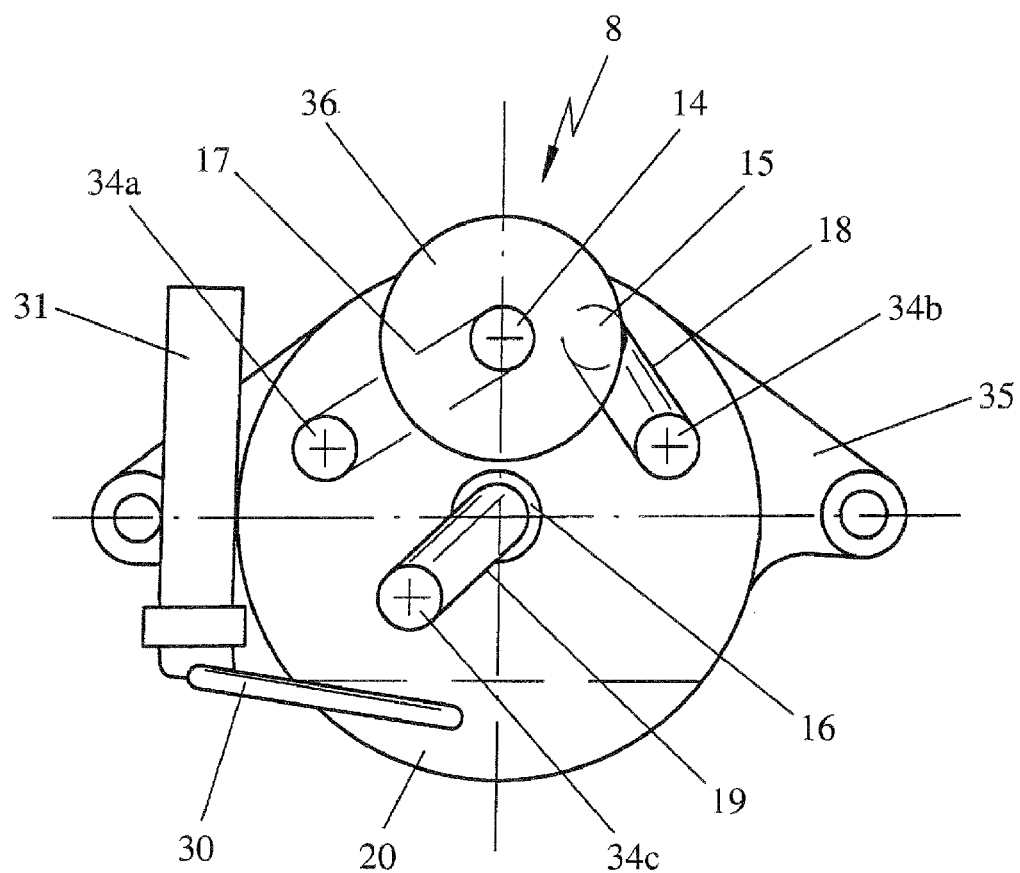
FIG. 3 shows the section line III-III of FIG. 2 in a simplified representation.

FIG. 3 displays the cutting section III-III from FIG. 2 in a strongly simplified view. With view to the main gear box 8, a torque arm 35, brake disc 36 and gearbox sump 20 is identifiable. In the left part of FIG. 3 the filter unit 31 is displayed with the suction pipe 30 existing in the lower part. For the explanation of the principle of solution according to the invention, the different shafts 14, 15, 16 of the main gear box 8 each can be coupled through a belt 17, 18 and 19 respectively with the input shaft 34 of the emergency lubrication pump 11 and/or of the switchable coupling 38. For differentiation of various scenarios, the input shaft 34 in FIG. 3 was characterized in each case with 34a, 34b and 34c. Thereby it is a question of the input shaft 34 of the emergency operation pump 11 and/or of the coupling 38. For the sole purpose of differentiation the letters a, b and c were used, in order to demonstrate the different coupling possibilities of this input shaft 34 with the shafts 14 to 16 of the main gear box 8.

Figure 4:
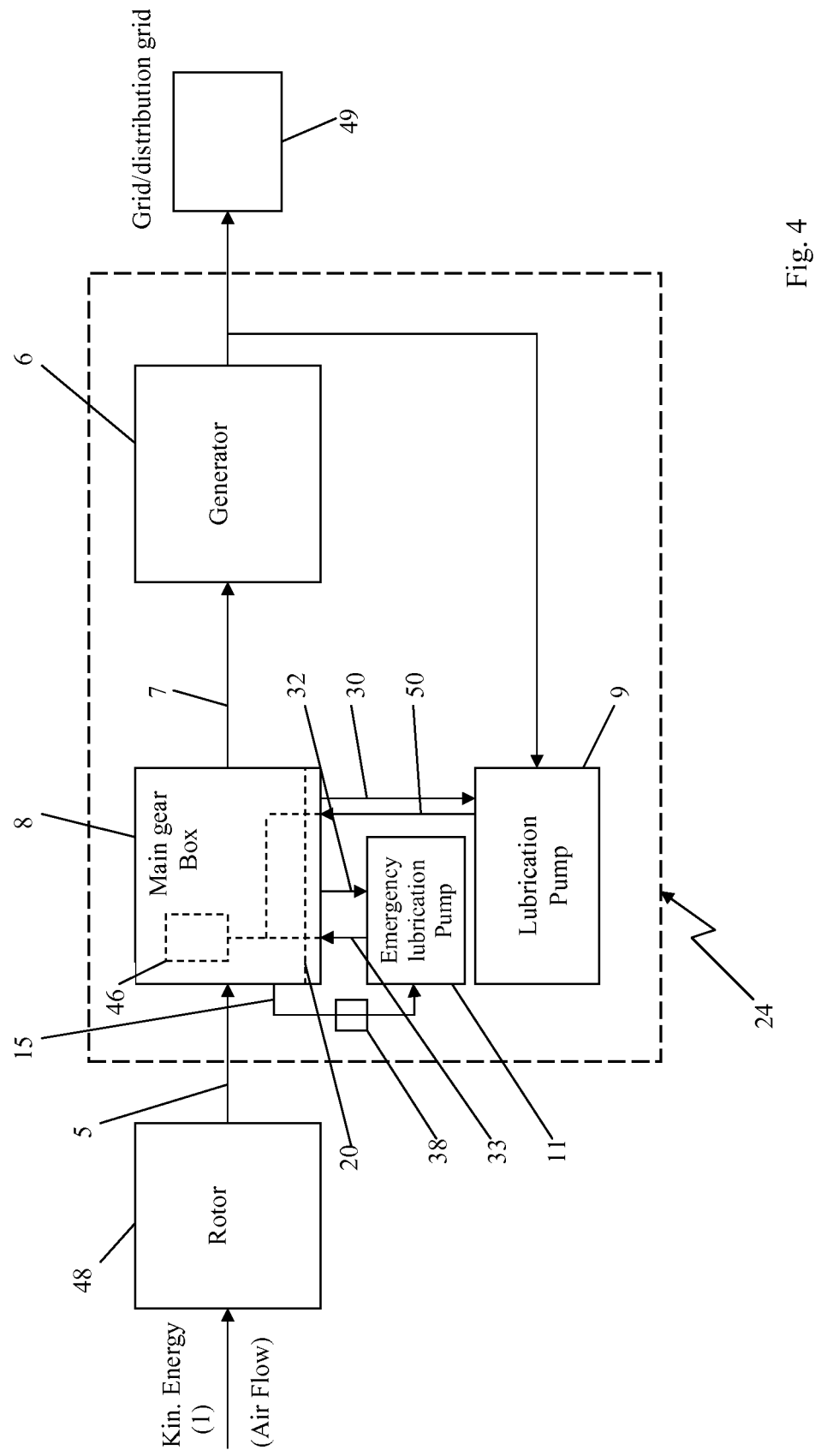
FIG. 4 is a simplified scheme for the representation of the principle of the inventive wind turbine generator.

FIG. 4 shows the operation of the inventive wind turbine generator in a highly simplified schematic way. The incoming air flow 1 on the rotor 48 has kinetic energy, which enables the rotor 48 in a rotational movement. This rotation is transferred through rotor 48 which is connected to rotor shaft 5 of the main gearbox 8. The main gear box 8 converts the rotation of the rotor shaft 5 to a speed that can be ingested by the generator 6 coupled with the main gearbox 8 at its small input shaft 7 so that the available kinetic energy at least partly is convertible to electrical energy. The electrical energy is delivered from generator 6 to customer. In particular generator 6 may be electrically coupled to an electric grid or distribution grid 49, which may be the public power distribution network, a wind park network or a different distribution network. Gearbox-generator unit 24 is shown in a dashed box which includes the main gearbox 8, generator 6 and lubrication pump 9 for the lubrication of parts subject to wear and tear 46, 47. The lubrication pump 9 provides lubricant to components subjected to wear and tear 46, 47 from gearbox sump 20 of main gearbox 8. The lubrication pump 9 is electrically powered from the electrical grid 49 and sucks lubricant through the suction pipe 30 from the gear box 8 and returns it again to the gear box by lubrication tube 50.

According to the invention the wind turbine generator is provided with the emergency lubrication pump 11, except its function is deactivated during normal operation and is only to be used during a rotating operation of the wind turbine generator or power failure. In the case of power failure the lubrication pump 9 cannot be supported with electrical energy. The emergency lubrication pump 11 can however gain its energy which is necessary for operation from the rotor 48. This function is particularly important for the operation of the emergency lubrication pump 11, because the emergency lubrication pump 11 if necessary can use the driving speed of the rotor 48 to supply lubricant to the components 46, 47 which are affected by wear. The emergency lubrication pump 11 is coupled or can be coupled with the intermediate shaft 15 (e.g. configuration 34b, shown in FIG. 3) under interconnection of switchable coupling 38, as it emanates from the FIG. 4. Emergency lubrication pump 11 sucks on the suction pipe 32 lubricants of main gearbox 8 and pumps it by the lubrication tube 33 again back to main gearbox 8.

Figure 5:
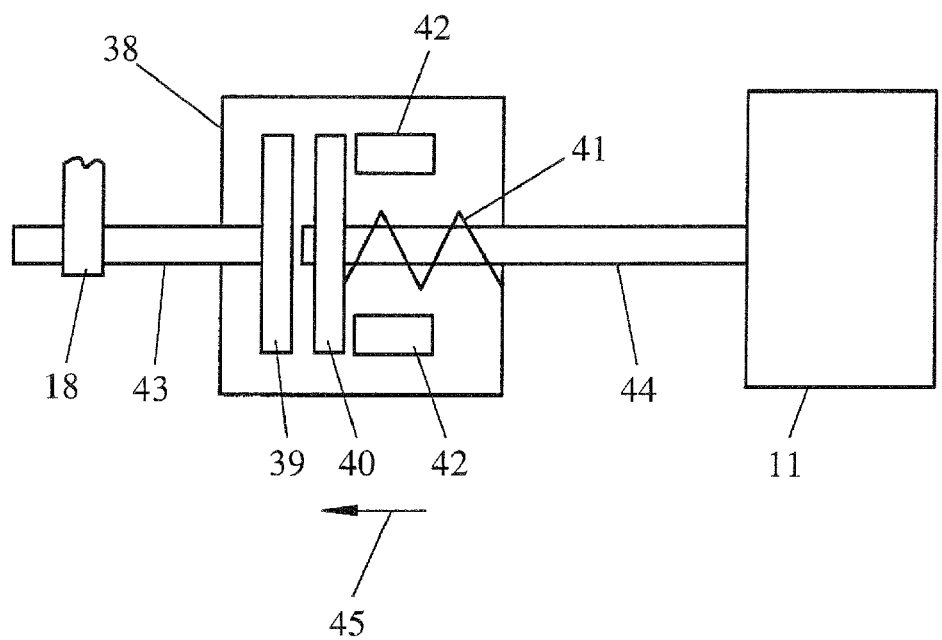
FIG. 5 is an example of a switchable coupling in a simplified representation.

FIG. 5 depicts an implementation possibility for the switchable coupling 38. The switchable coupling 38 has a first clutch disk 39 rigidly connected to the input shaft 43 of coupling 38 which rotates a second coupling disc 40 associated with the output shaft 44 of switchable coupling 38. The second coupling disc 40 is moved in the direction of and in the opposite direction of the arrow 45 on the output shaft 44 by a preloaded spring 41.

Further electromagnets 42 are provided, which can move the second coupling disc 40 away from the first coupling disc 39 in the opposite direction of the arrow 45. In the deenergized state of the electromagnet 42 the spring 41 pushes the second coupling disc 40 against the first coupling disc 39, so that both the coupling discs 39, 40 as well as both the shafts 43, 44 are frictionally coupled with one another for the transmission of rotational motion. The emergency pump 11, in this condition, is switchably coupled with the respective shafts 14, 15 or 16 of the main gear box 8 (here with shaft 15 through belt 18) and is powered by the rotor 48. In the energized state of the electromagnet 42 the second coupling disc 40 is moved in the opposite direction of the arrow 45 away from the first coupling disc 39, so that both the shafts 43, 44 are separated from each other. The emergency pump 11 is decoupled in this condition by the respective shafts 14, 15 or 16 of the main gear box 8 and is not powered by the rotor 48.

The shaft 43 is concerned with the input shaft 34, in case of 34b. According to a variant 42 reference drawing can represent a hydraulic opening possibility for the coupling 38.

LIST OF REFERENCE NUMERALS

1. Air Flow
2. Rotor Axis
3. Rotor Blades
4. Rotor Blades
5. Rotor Shaft
6. Generator
7. Generator Input Shaft
8. Main Gear Box
9. Lubrication Pump
10. Wind Turbine Generator
11. Emergency Lubrication Pump
12. Coupling
14. Shaft
15. Shaft
16. Shaft
17. Belt or Chain
18. Belt or Chain
19. Belt or Chain
20. Gearbox Sump
21. Foundation
22. Tower
23. Nacelle
24. Gearbox—Generator Unit
25. Turbine Controller
26. Yaw Drive
27. Rotor Hub
28. Pitch Drive
29. Pitch Drive
30. Suction Pipe
31. Filter Unit
32. Suction Pipe
33. Lubrication Tube
34. Input Shaft of Emergency Lubrication Pump/Switchable Coupling
34a. Input Shaft of Emergency Lubrication Pump/Switchable Coupling (Variant A)
34b. Input Shaft of Emergency Lubrication Pump/Switchable Coupling (Variant B)
34c. Input Shaft of Emergency Lubrication Pump/Switchable Coupling (Variant C)
35. Torque Arm
36. Brake Disc
37. Gearbox
38. Switchable Coupling
39. Coupling Disc
40. Coupling Disc
41. Spring
42. Electromagnet
43. Input Shaft of Switchable Coupling
44. Output Shaft of Switchable Coupling
45. Arrow
46. Components Subject to Wear and Tear
47. (Shaft) Bearing
48. Rotor
49. Grid/Distribution Grid
50. Lubrication Tube
51. Rotor Blade Axis
52. Rotor Blade Axis

The invention claimed is:

1. A wind turbine generator for the generation of electrical power through incident air flow on a rotor rotating around a rotor axis with multiple rotor blades being coupled via a rotor shaft to a generator, comprising:
a main gear box comprising a drive shaft rotationally coupled to the rotor shaft, an output shaft rotationally coupled to a generator input shaft, and an intermediate shaft, wherein the main gear box is configured to translate a rotation speed of the rotor shaft to a rotation speed of the generator input shaft and a rotation speed of the intermediate shaft;
a lubrication pump configured to feed lubricant to components that are subject to wear and tear during normal operation of the wind turbine generator;
an emergency lubrication pump comprising an input shaft and configured to feed lubricant to the components that are subject to wear and tear, and
a coupling unit having an input shaft coupled to the intermediate shaft of the main gear box and an output shaft coupled to the emergency lubrication pump
wherein the emergency lubrication pump is deactivated by the coupling unit under normal operation of the wind turbine generator and is activated by the coupling unit upon deactivation of the lubrication pump by selectively decoupling and coupling, respectively, the input and output shafts of the coupling unit and
wherein the rotation speed of the intermediate shaft is less than the rotation speed of the generator input shaft and greater than the rotation speed of the rotor shaft.

2. The wind turbine generator as set forth in claim 1, wherein the coupling unit includes a switchable coupling.

3. The wind turbine generator as set forth in claim 2 wherein the switchable coupling includes one of an electrical magnetic decoupler and a hydraulic decoupler.

4. The wind turbine generator as set forth in claim 2 wherein the switchable coupling is configured to close by a spring mechanism to activate the emergency lubrication pump and is configured to open under normal operation of the wind turbine generator.

5. The wind turbine generator as set forth in claim 2 wherein the switchable coupling includes an electromagnet.

6. The wind turbine generator as set forth in claim 1, wherein the main gear box is configured to translate the rotation speed of the rotor shaft to the rotation speed of the intermediate shaft during both normal operation and when the lubrication pump is deactivated.

7. A wind turbine generator for the generation of electrical power through incident air flow on a rotor rotating around a rotor axis with multiple rotor blades being coupled via a rotor shaft to a generator, comprising:
a main gear box comprising a drive shaft rotationally coupled to the rotor shaft, an output shaft rotationally coupled to a generator input shaft, and an intermediate shaft, wherein the main gear box is configured to translate a rotation speed of the rotor shaft to a rotation speed of a generator input shaft and a rotation speed of the intermediate shaft;
a lubrication pump configured to feed lubricant to components that are subject to wear and tear during normal operation of the wind turbine generator;
an emergency lubrication pump comprising an input shaft and configured to feed lubricant to the components that are subject to wear and tear;
an emergency torque transmission unit configured to translate one of the rotation speed of the rotor shaft, the rotation speed of the intermediate shaft, and the rotation speed of the generator input shaft to a rotation speed of the input shaft of the emergency lubrication pump; and a coupling unit having an input shaft coupled to an output of the emergency torque transmission unit and an output shaft coupled to the input shaft of the emergency lubrication pump, the coupling unit being configured to selectively activate and deactivate the emergency lubrication pump by selectively coupling and decoupling, respectively, the input shaft of the emergency lubrication pump to and from the emergency torque transmission unit, wherein the emergency lubrication pump is deactivated under normal operation of the wind turbine generator and is activated upon deactivation of the lubrication pump.

8. The wind turbine generator as set forth in claim 7, wherein the emergency torque transmission unit is configured to translate the rotation speed of the rotor shaft to the rotation speed of the input shaft of the emergency lubrication pump and the rotation speed of the rotor shaft is less than the rotation speed of the input shaft of the emergency lubrication pump.

9. The wind turbine generator as set forth in claim 7, wherein
the main gear box has a rotor side and a generator side, the rotor shaft is coupled to the main gear box at the rotor side, the generator input shaft is coupled to the main gear box at the generator side, and the main gear box includes the output shaft at the generator side which has the same rotation speed as the rotor shaft, and
the emergency torque transmission unit is coupled to the output shaft of the main gear box at the generator side and is configured to translate the rotation speed of the output shaft and rotor shaft to the rotation speed of the input shaft of the emergency lubrication pump.

10. The wind turbine generator as set forth in claim 7, wherein the emergency torque transmission unit is configured to translate the rotation speed of the generator input shaft to the rotation speed of the input shaft of the emergency lubrication pump and the rotation speed of the generator input shaft is greater than the rotation speed of the input shaft of the emergency lubrication pump.

11. The wind turbine generator as set forth in claim 7, wherein the main gear box is configured to translate the rotation speed of the rotor shaft to the rotation speed of the intermediate shaft during both normal operation and when the lubrication pump is deactivated.

12. A wind turbine generator for the generation of electrical power through incident air flow on a rotor rotating around a rotor axis with multiple rotor blades being coupled via a rotor shaft to a generator, comprising:
a main gear box comprising a drive shaft rotationally coupled to the rotor shaft, an output shaft rotationally coupled to a generator input shaft, and an intermediate shaft, wherein the main gear box is configured to translate a rotation speed of the rotor shaft to a rotation speed of the generator input shaft and a rotation speed of the intermediate shaft;

a lubrication pump configured to feed lubricant to components that are subject to wear and tear during normal operation of the wind turbine generator;
an emergency lubrication pump having an input shaft and configured to feed lubricant to the components that are subject to wear and tear;
an emergency torque transmission unit configured to translate one of the rotation speed of the drive shaft, the rotation speed of the output shaft and the rotation speed of the intermediate shaft to a rotation speed of the input shaft of the emergency lubrication pump; and
a coupling unit having an input shaft coupled to one of the drive shaft, the output shaft and the intermediate shaft and an output shaft coupled to an input of the emergency toque transmission unit, the coupling unit being configured to selectively activate and deactivate the emergency lubrication pump by selectively coupling and decoupling, respectively, the emergency torque transmission unit to and from the one of the drive shaft, the output shaft and the intermediate shaft,
wherein the emergency lubrication pump is deactivated under normal operation of the wind turbine generator and is activated upon deactivation of the lubrication pump.

13. The wind turbine generator as set forth in claim 12, wherein the emergency torque transmission unit is configured to translate the rotation speed of the drive shaft to the rotation speed of the input shaft of the emergency lubrication pump and the rotation speed of the rotor shaft is less than the rotation speed of the input shaft of the emergency lubrication pump.

14. The wind turbine generator as set forth in claim 12, wherein
the main gear box has a rotor side and a generator side, the rotor shaft is coupled to the main gear box at the rotor side, the generator input shaft is coupled to the main gear box at the generator side, and the main gear box includes the output shaft at the generator side which has the same rotation speed as the rotor shaft, and
the emergency torque transmission unit is coupled to the output shaft of the main gear box at the generator side and is configured to translate the rotation speed of the output shaft and rotor shaft to the rotation speed of the input shaft of the emergency lubrication pump.

15. The wind turbine generator as set forth in claim 12, wherein the emergency torque transmission unit is configured to translate the rotation speed of the output shaft to the rotation speed of the input shaft of the emergency lubrication pump and the rotation speed of the output shaft is greater than the rotation speed of the input shaft of the emergency lubrication pump.

16. The wind turbine generator as set forth in claim 12, wherein the main gear box is further configured to translate the rotation speed of the rotor shaft to the rotation speed of the intermediate shaft during both normal operation and when the lubrication pump is deactivated.

* * * * *